United States Patent [19]

Crall

[11] Patent Number: 4,814,870

[45] Date of Patent: Mar. 21, 1989

[54] PORTABLE INFRARED IMAGING APPARATUS

[75] Inventor: Richart F. Crall, Tualatin, Oreg.

[73] Assignee: Compix Incorporated, Tualatin, Oreg.

[21] Appl. No.: 81,835

[22] Filed: Aug. 5, 1987

[51] Int. Cl.[4] .............................................. H04N 5/33
[52] U.S. Cl. ..................................... 358/113; 358/208
[58] Field of Search .............. 358/113, 208, 206, 199, 358/209, 229, 225; 250/334, 347, 236

[56] References Cited

U.S. PATENT DOCUMENTS

| | | |
|---|---|---|
| 3,021,428 | 2/1962 | Mattke et al. . |
| 3,157,728 | 11/1964 | Comstock, Jr. . |
| 3,256,435 | 6/1966 | Astheimer . |
| 3,403,399 | 9/1968 | Jacobs et al. ................... 358/113 X |
| 3,456,111 | 7/1969 | Barnes et al. . |
| 3,499,153 | 3/1970 | Stanfill, III . |
| 3,562,529 | 2/1971 | Engborg et al. . |
| 3,576,944 | 5/1971 | LaBaw . |
| 3,612,878 | 10/1971 | Nelson . |
| 3,624,400 | 11/1971 | Cohen . |
| 3,730,985 | 5/1973 | Whitney . |
| 3,793,124 | 8/1976 | Astheimer . |
| 3,803,413 | 4/1974 | Vanzetti et al. . |
| 3,862,423 | 1/1975 | Kutas et al. . |
| 3,868,508 | 2/1975 | Lloyd . |
| 3,953,667 | 4/1976 | Layton et al. . |
| 4,086,616 | 4/1978 | Catano et al. . |
| 4,152,588 | 5/1979 | Klatt et al. . |
| 4,178,522 | 12/1979 | MacLennan et al. . |
| 4,214,271 | 7/1980 | Jones et al. . |
| 4,225,883 | 9/1980 | Van Atta et al. . |
| 4,262,199 | 4/1981 | Bridges et al. . |
| 4,347,530 | 8/1982 | Stetson ................................ 358/113 |
| 4,417,822 | 11/1983 | Stein et al. . |
| 4,508,422 | 4/1985 | Karlsson ......................... 358/206 X |
| 4,538,181 | 8/1985 | Taylor .................................. 358/208 |
| 4,560,869 | 12/1985 | Hien et al. . |
| 4,575,632 | 3/1986 | Lange . |
| 4,626,905 | 12/1986 | Schmidt .......................... 358/113 X |
| 4,638,371 | 1/1987 | Milch .............................. 358/199 X |
| 4,639,774 | 1/1987 | Fried . |
| 4,672,439 | 6/1987 | Florence et al. ..................... 358/113 |

Primary Examiner—James J. Groody
Assistant Examiner—Victor R. Kostak
Attorney, Agent, or Firm—Kolisch, Hartwell & Dickinson

[57] ABSTRACT

Manually portable apparatus enabling high-resolution, two-dimensional infrared imaging of remote, non-contacting targets is described. An on-axis optical subsystem consists of a single, single-faceted planar scanning mirror that is reciprocable by stepper motors about two orthogonal axes. Oriented at approximately 45° relative to the mirror's line-of-sight axis to a target, the scanning mirror reflects infrared energy incident thereon toward a spherical converging mirror, which may be manually focused to change the distance between it and a single-element, non-cryogenically cooled, heat-sensitive detector located behind the scanning mirror. An ADC, a microprocessor and a motor control circuit provide means for imaging the target by sampling the serial, conditioned output of the detector in timed relation to the angular positions of the stepper motors, and transforming energy density data to temperature data in a two-dimensional, pixel array. Integral display means are provided, by which a colorable infrared image may be viewed. In a proposed modification, a parabolic, rather than spherical, converging mirror is used. In another proposed modification, the detector interposes the scanning mirror and the converging mirror, insubstantially occluding the infrared energy reflected by the former.

17 Claims, 2 Drawing Sheets

PORTABLE INFRARED IMAGING APPARATUS

BACKGROUND AND SUMMARY OF THE INVENTION

This invention relates generally to infrared imaging apparatus. More particularly, the invention concerns a manually portable instrument capable of high-resolution, two-dimensional infrared imaging of a remote target.

Commercial thermographic products are rooted in the military technologies developed for night vision, reconnaissance and targeting, in which the real-time imagery of moving targets is made possible by complex, costly apparatus that use exotic materials, multi-element detector arrays and cryogenic cooling to achieve high-resolution, flicker-free infrared images. Such complex opto-electronic systems impose a maintenance burden that few commercial users are able or willing to bear.

Many commercial applications for thermographic products have vastly simpler requirements. Frequently, the infrared imaging subject, or target, is stationary or may be constrained to remain so for several seconds. The infrared imaging apparatus most often is stationary. The production of a 'snapshot', or single frame, infrared image every few seconds, rather than many times per second, would satisfy most commercial users. Notwithstanding the less demanding environments of many commercial applications, most commercial users require high-quality, two-dimensional thermographic imaging, which may be characterized as having resolution that rivals the resolution of the most costly military products.

One commercial application in which the seemingly incongruous goals of low-cost, manually portable, high-resolution infrared imaging must be met is the thermal fault analysis of electronic circuit boards on the design bench, on the manufacturing floor or in the field. Such instrumentation must be capable of producing a high-resolution, two-dimensional, colorable, thermal image of a remote (noncontacting) target; it must be compact enough to be manually portable, while durable enough to withstand the harsh treatment that portability invites; and it must require only minimal calibration and preventive maintenance.

Accordingly, it is a principal object of the present invention to provide high-resolution infrared imaging apparatus in a manually portable instrument.

Another important object is to provide apparatus capable of producing an integral, color mappable, two-dimensional pixel image that may be stored, manipulated, displayed and telecommunicated over conventional data communication channels.

A further object of the invention is to provide a flexibly positionable infrared, optical subsystem that requires no cryogenic cooling.

Yet another object is to provide apparatus having a minimal number of optical devices requiring critical alignment.

Another important object of the invention is to provide apparatus that is highly tolerant of the slight opto-mechanical misalignments that may result from the ordinary use of manually portable instruments.

The apparatus of the invention combines, in what is referred to as an on-axis, optical subsystem, a single, reciprocably rotating, single-faceted, planar scanning mirror; a spherically concave converging mirror; and a single-element, non-cryogenically cooled, heat-sensitive element as means for detecting, pixel by pixel, the thermal radiation of a remote target. Image forming means includes a preamplifier circuit, a microprocessor and a frame memory in which a composite, two-dimensional, pixel representation of the thermal profile of the target is stored. Conventional, color mappable display means provides a visible image representative of the temperature of the target. The microprocessor also provides control for the drive motors that reciprocate the scanning mirror and, in the preferred embodiment of the invention, further provides a communication path, via a conventional data communications channel, to optional, remote data communications equipment.

In the preferred embodiment of the invention, the scanning mirror is reciprocable about two orthogonal axes, one of which is collinear with the focal axis of the converging mirror. Conventional stepper motors are used to reciprocate the scanning mirror in a raster, or so-called "flying spot" scan of the target. The lead selenide (PbSe) detector is located at the focal point of the converging mirror, and 'behind' the scanning mirror (on the side of the scanning mirror opposite the converging mirror), a central region of which is transmissive, rather than reflective, of the infrared energy directed by the converging mirror toward the detector.

Infrared energy emanating from the target and along a line-of-sight axis from the target to the scanning mirror is reflected thereby onto the reflective surface of the converging mirror, from which it is directed through the transmissive region of the scanning mirror and focused on the detector. The detector produces a signal representative of the infrared radiation of the target at sequential, elemental, pixel locations thereacross. A preamplifier circuit and an analog to digital converter (ADC) condition the signal for digital presentation to the microprocessor, which processes the data based upon its monitoring and controlling of the instantaneous position of the stepper motors.

A housing in which the optics, or optical subsystem, is flexibly tripod-mounted may be located at some distance from the instrument containing the electronics and display monitor. Alternatively, the housing may be secured to the end of a flexibly positionable, articulated arm which extends from the portable instrument and provides for the positioning and orientation of the optics relative to the target. In a proposed modification, a parabolic converging mirror is used. In yet another, the detector interposes the converging mirror and the scanning mirror.

Thus, the objects of the invention are achieved: a manually portable instrument provides for the high-resolution, infrared imaging of remote targets by the use of an on-axis, optical system that is highly tolerant of inadvertent misalignment. The combination of non-cryogenically cooled, single-element detection; conventional stepper motor reciprocation of a flying spot scanning mirror; and digital motor control and data manipulation enable unprecedented low-cost, high-performance, infrared imaging.

These and other objects and advantages of the present invention more clearly will be understood from a consideration of the drawings and the following description of the preferred embodiment.

DETAILED DESCRIPTION OF THE PREFERRED EMBODIMENT

Figure 1:
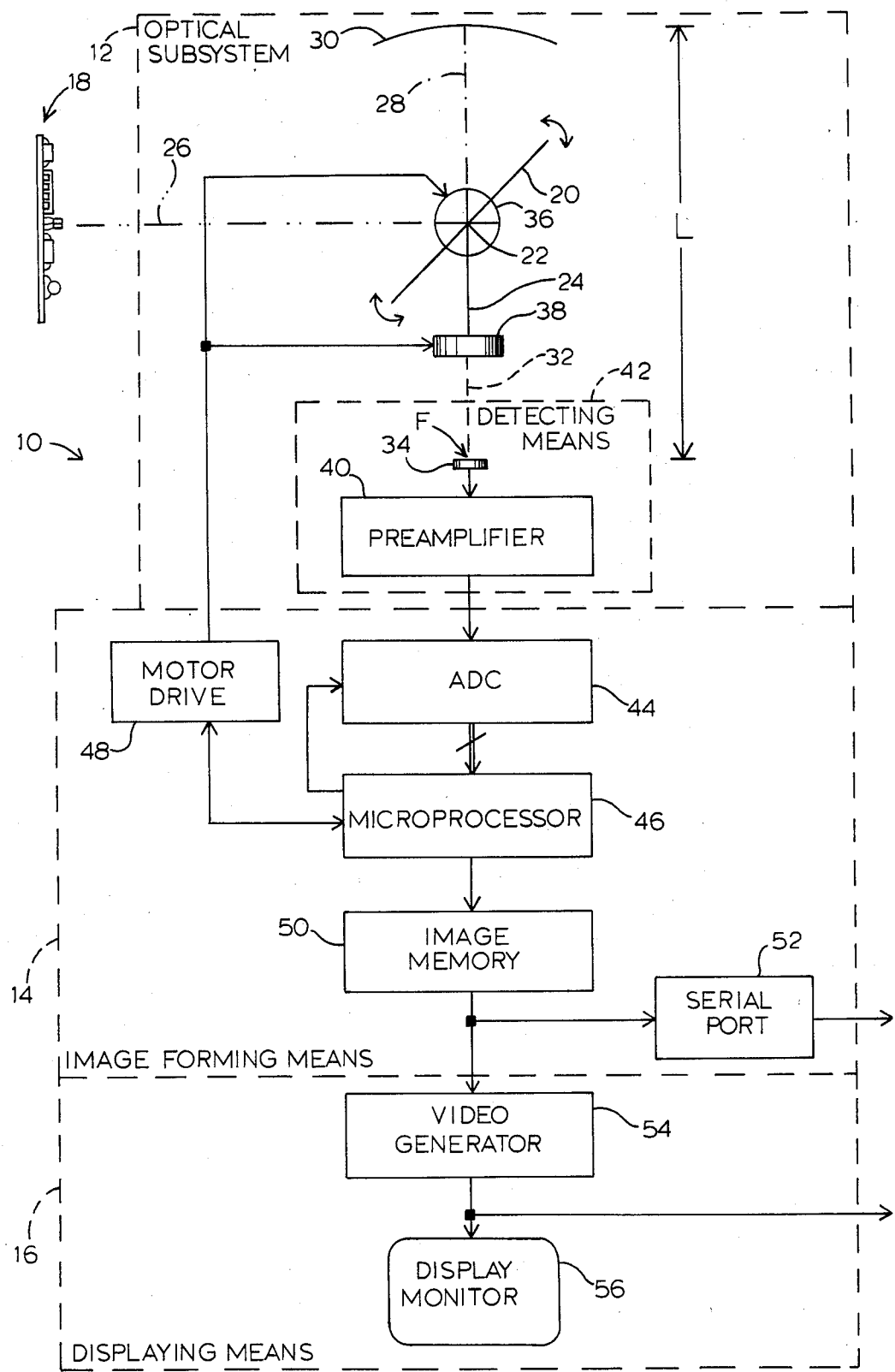
FIG. 1 schematically illustrates, in block diagram form, apparatus made in accordance with the preferred embodiment of the invention.

Referring first to FIG. 1, it will be seen that the apparatus of the present invention, in its preferred embodiment, is indicated generally at 10, and includes an optical subsystem 12, image forming means 14 and displaying means 16. It will be appreciated that optical subsystem 12 is illustrated schematically, and in what generally represents a side elevation of its physical structure, to facilitate an understanding of its important geometries, whereas image forming means 14 and displaying means 16 are illustrated schematically, and in functional block diagram form.

A remote, or non-contacting target 18 is shown, for purposes of illustration, as an edgewise view of an etched circuit board having electrical components on the face thereof (on the right side in FIG. 1). A single-faceted, planar scanning mirror 20, is controllably and reciprocably rotatable about two orthogonal axes 22, 24. A line-of-sight axis 26 is defined as extending between target 18 and scanning mirror 20, and may be thought of as being the axis along which infrared radiation from target 18 approaches scanning mirror 20, thus representing the central axis of the instantaneous field of view of scanning mirror 20.

Infrared energy incident upon scanning mirror 20, which is oriented nominally at a 45° angle to axis 26, is reflected from the reflective surface of mirror 20 in a direction that will be referred to herein as a reflection axis 28. A curvilinear, preferably spherical converging mirror 30, whose geometry defines a focal point F at a focal length L along a focal axis 32, is positioned above scanning mirror 20 generally along axis 28, and is dimensioned to receive a substantial fraction of the infrared energy incident on mirror 20, to reflect such energy into a convergent beam, and to direct such beam toward the detecting means to be described. A single-element, heat-sensitive element, or detector 34, which in the preferred embodiment is of PbSe material, is positioned 'behind' scanning mirror 20, or on the opposite side of scanning mirror 20 from converging mirror 30, preferably at focal point F.

Importantly, focal axis 32 is, in the preferred embodiment of the invention, generally collinear with reflection axis 28 of scanning mirror 20. As detector 34 is located at focal point F of converging mirror 30, it too is collinear with focal axis 32. The resulting collinearity of scanning mirror 20, converging mirror 30 and detector 34 is referred to herein as an on-axis optical arrangement to distinguish apparatus in which, for example, a detector such as detector 34 is laterally offset from a converging mirror's focal axis, and infrared energy is directed toward it by way of a lens or a turning mirror.

It will be appreciated that the fewer the number of optical elements in an optical subsystem, the fewer alignments and lesser preventive maintenance that are required.

Referring still to FIG. 1, means for controllably, reciprocably rotating mirror 20 about orthogonal axes is seen to include a scanning stepper motor 36 and a panning stepper motor 38. In the preferred embodiment of the invention, mirror 20 reciprocally is scanned about horizontal axis 22 at a frequency in the range of approximately 6 to 12 Hz and within an angular range of between approximately 40° and 50° (±5° relative to its null, or nominally 45° angled position), as indicated by arrows. Scanning mirror 20 traverses thereby a pixel-wide column of target 18, and instantaneously is oriented to receive infrared energy incident along axis 26 and to reflect the same along axis 28. Also in the preferred embodiment of the invention, mirror 20 reciprocally is panned about vertical axis 24, which is generally collinear with focal axis 32, at a frequency of approximately 1/30 Hz. Scanning mirror 20 thereby traverses consecutive, pixel-wide columns of target 18, by the incremental stepping of motor 38 at the end of each such columnar traversal. It will be appreciated that, although in the preferred embodiment Hall effect devices (not shown) are used to indicate angular positional extrema, any one of a number of alternative limit switch or proximity measuring devices may be used within the spirit of the invention.

Thus, by the cooperation of motors 36, 38 under the control of a microprocessor, one 'snapshot', or single-frame image of the thermal profile of target 18 may be scanned approximately every 30 seconds (for a high-resolution image), or in less time (for a lower resolution image). It will be appreciated that, in the preferred embodiment of the invention, orthogonal axes 22, 24 intersect generally in the plane of scanning mirror 20 and generally at its center. It also will be appreciated that, in the preferred embodiment, scanning mirror 20 is positioned relative to converging mirror 30 so that focal axis 32 intersects scanning mirror 20 generally at the center thereof.

Detector 34 and a preamplifier 40 combine to provide means for detecting the level of infrared energy incident upon scanning mirror 20 in timed relation to the rotating thereof. Detector 34 need not be cryogenically cooled, by which is meant that it operates with sufficient noise immunity at temperatures well above −100° C. (173 K.). Numerous advantages flow from this fact, including the portability of the apparatus; the flexible orientation that the optical subsystem may assume; the low mass of the optical subsystem; the self-contained nature of the apparatus, as not requiring external plumbing; and the low maintenance required, as compared with cryogenically cooled systems, wherein Dewar flasks and other cryostatic elements periodically must be checked and filled.

By referring to detector 34 as a single element detector, it is meant that detector 34 produces a single, time variant analog output, responsive to the infrared energy incident upon its active surface, and representative of the energy density of target 18 at multiple, elemental locations thereacross. This may be distinguished from more costly, and difficult to align and maintain, multi-element detector arrays, in which multiple analog signals are produced, within a unit of time, in parallel fashion. It will be appreciated by those skilled in the art that an optical subsystem, such as subsystem 12, may be made at relative low cost, mass and volume by the use of a single element, non-cryogenically cooled detector.

It will be noted that preamplifier 40 is illustrated as being a part of optical subsystem 12. Because of the relatively low-amplitude, and thus noise susceptible, nature of the modulated signal produced by detector 34, preamplifier 40 must be located physically a short distance from detector 34. In the preferred embodiment, preamplifier 40 is located less than 1 cm therefrom, providing the needed noise immunity. Preferably, detector 34 and preamplifier 40 may be integrated onto a single substrate of semiconductor material or packaged integrally by hybrid packaging means.

Importantly, reciprocal scanning mirror 20, detecting means 42 and image forming means 14 cooperate in such manner that detector 34 need not be cryogenically cooled as in prior art apparatus, while apparatus 10 is capable of producing the high-resolution images heretofore thought possible only in massive, complex, high-cost equipment. Because detector 34, in uncooled operation, would exhibit high noise susceptibility, relatively low-bandwidth preamplifier 40 is impedance matched to detector 34, thereby substantially reducing the presence of noise and yielding high detectivity without cryogenic cooling. Those skilled in the art will appreciate that the bandwidth of preamplifier 40 need be only approximately as high as the rate at which pixels are processed by image forming means 14, which, in the preferred embodiment, is approximately 6 kHz. Thus, portable apparatus are realized, which achieve the seemingly inconsistent objects of high-resolution and low-cost, and which produce two-dimensional, infrared images at a moderate rate.

Referring still to FIG. 1, means, responsive to the output of preamplifier 40, for producing data which represent a high-resolution, two-dimensional image of the thermal profile of target 18 are indicated generally at 14. Data producing, or image forming, means 14 is seen to include a 12-bit analog-to-digital convertor (ADC) 44; computer means, or a microprocessor 46; and a motor drive circuit 48. Under the control of microprocessor 46, ADC 44 samples the output of preamplifier 40 in timed relation to the relative angular position of motors 36, 38, whose positions are monitored and controlled, via motor drive circuit 48, by microprocessor 46. In a manner well-known to those of ordinary skill in the art, microprocessor 46 thus controls the angular position of motors 36, 38 by issuing stepping pulses; monitors their position by maintaining counters which may be incremented every time a stepper pulse is issued; and clocks ADC 44 to sample the output of preamplifier 40 in timed relation to motors 36, 38, while avoiding positional inaccuracies resulting from, e.g. backlash or chatter.

It will be noted that, because of the signal conditioning effect of preamplifier 40, the associated electronics of imaging forming means 14 may be located at some distance from optical subsystem 12. In the preferred embodiment of the invention, image forming means 14 and displaying means 16 are located in a separate, manually portable cabinet (not shown) and optical subsystem 12 may be distanced up to 3 m therefrom.

Microprocessor 46 responds to ADC 44 by capturing the 12 bits of digital data, compensating for any non-linearities in detector 34 and, by straightforward table lookup means, maps the power density represented by the output of preamplifier 40 into the temperature of target 18 represented thereby. The result of this digital manipulation by microprocessor 46 is an array of binary data, which in the preferred embodiment are 8-bit bytes, representing the relatively time-invariant temperature image of the target during one complete scanning cycle of mirror 20. Such bytes are stored in data storing means, or an image memory 50 in such manner that they may be retrieved, further manipulated, transmitted via serial port 52 to data communications equipment (not shown) or displayed.

It will be appreciated that microprocessor 46 is capable of manipulating data to represent the absolute temperature of target 18 by conventional calibration means and methods, e.g. the use of a reference or standard of known temperature. It also will be appreciated that microprocessor 46 may perform a variety of data manipulations on the pixel image. For example, the replication of alternate columns of pixel data into adjacent columns would allow a complete pixel image to be produced in one half of the normal cycle, as microprocessor advantageously controls both motors 36, 38 and ADC 44. Similarly, microprocessor 46 may be used to provide image enhancement, e.g. conventional color mapping may be provided to allow a display more effectively to represent temperature ranges or resolutions specific to the user's needs.

Displaying means 16 includes a video generator 54, which is capable of producing a composite video signal preferably compatible with conventional display monitors. The video signal that is outputted by video generator 54 is routed to a bulkhead connector on the portable cabinet, for optional presentation to external video recording equipment. Finally, the output of video generator 54 is inputted to display monitor 56 for visible, infrared imaging. It will be appreciated that, while in the preferred embodiment the display device is display monitor 56, alternative display devices, e.g. a strip chart recorder, may be used.

Figure 2:
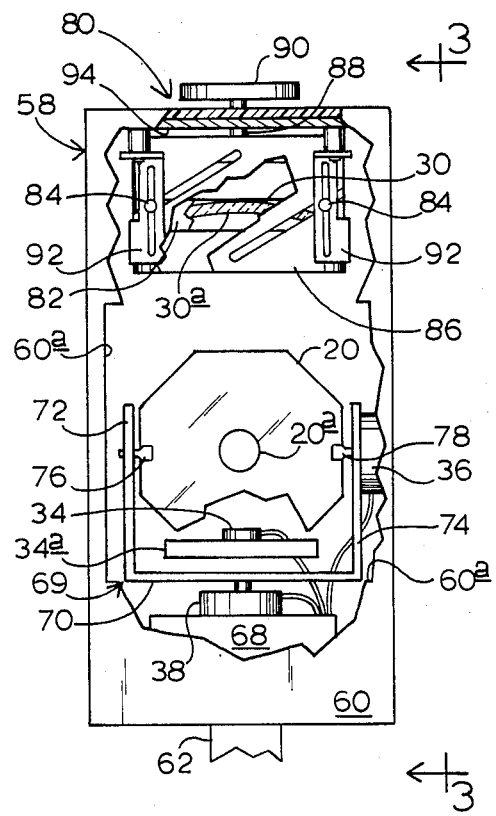
FIG. 2 shows, in a front elevation, the optical subsystem of the apparatus.
Figure 3:
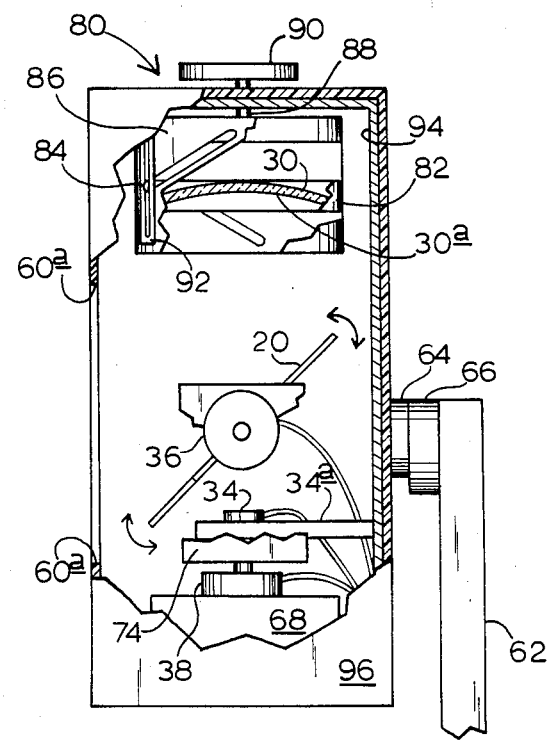
FIG. 3 shows the optical subsystem, in a side elevation taken generally along the lines 3—3 in FIG. 1.

Referring collectively now to FIGS. 2 and 3, the structural details of the preferred embodiment of the optical subsystem are described. It will be understood that components of optical subsystem 12 illustrated in FIGS. 2 and 3 are designated identically with corresponding components of FIG. 1. Thus, FIG. 2 shows, in front elevation, scanning mirror 20 (whose projection into the vertical plane is generally square) having a central region 20a that has been treated in such manner that it is capable of substantially transmitting infrared energy incident thereon. In the preferred embodiment, region 20a is so treated by cutting an elliptical hole through mirror 20 (illustrated in FIG. 2 as a projected circle). It is this central, transmissive region 20a that permits infrared energy to be directed by converging mirror 30 onto detector 34, which, in the preferred embodiment, is located behind scanning mirror 20.

Scanning mirror 20 may be seen to be positioned approximately in the center of a rectilinear optical subsystem housing 58. Housing 58, which in the preferred embodiment is constructed of plastic, has a front panel 60 with edges 60a forming a rectangular hole through which infrared energy from target 18 may pass. It will be appreciated that, although in the preferred embodiment the hole formed by edges 60a is not covered, it may be covered, within the spirit of the invention, by an infrared energy transmissive material that substantially does not affect the infrared energy passing therethrough. Housing 58 is attached to an extension 62 of a tripod (not shown) via a fixed shaft 64 and a rotatable bearing assembly 66. In its preferred embodiment, housing 58 compactly houses optical subsystem 12 in an approximately 11.25 cm ×12.5 cm ×25 cm space.

It will be appreciated that, by virtue of the fact that single element detector 34 requires no liquid cooling, and by virtue of the novel, simplified structure of optical subsystem 12, housing 58 may be oriented in virtually any position without diminishing the imaging sensitivity or resolution of apparatus 10, which accurately can resolve 0.2° C. temperature differences at target 18. Thus, it will be understood that the orientation of optical subsystem 12 described and illustrated herein is chosen for convenience and consistency, and is neither a required nor a preferred operational orientation.

A motor mount 68, which rigidly is connected to the bottom of housing 58, fixes panning motor 38 relative to housing 58 so that its shaft extends upwardly and generally vertically. A yoke 69, comprising shaft-mounted horizontal member 70 and laterally spaced apart, vertically extending, left and right support members 72, 74, rotatably mounts scanning mirror 20 and scanning motor 36 via left and right mirror mounts 76, 78. The combination of a needle bearing (not shown) between member 72 and mount 76, and the integral bearing on which the shaft of motor 36 (and thus shaft-mounted mirror mount 78) rotates facilitates the smooth, controllable scanning reciprocation of mirror 20. It will be appreciated that a counterweight may be added to left mirror mount 76 to compensate for the mass of motor 36, although in the preferred embodiment this is not deemed necessary.

It is important to note that by the structure and orientation of yoke 69 relative to motor 38 and mount 68, and by virtue of the fact that mirror mounts 76, 78 grasp scanning mirror 20 approximately in the vertical center thereof, scanning mirror 20 reciprocates on orthogonal axes 22, 24 (refer to FIG. 1) in a substantially balanced way. The balanced motion of the reciprocally rotating assembly minimizes angular positional inaccuracies and renders the pivotal movement of mirror 20 highly linear and repeatable. It will be appreciated that the extraordinary simplicity of the scanning portion of optical subsystem 12, as including a single, low-mass, single-faceted, planar scanning mirror, and low-mass, dual stepper motors further enhances the positional accuracy and repeatability of the scanning process, thereby improving the sensitivity and resolution of detecting means 42.

In the preferred embodiment, detector 34 is mounted on a heatsink 34a, which rigidly extends from a rear framing member of housing 58. While detector 34 may be operated at room temperature, with adequate ventilation and conventional heatsinking, nevertheless in the preferred embodiment of the invention its operating temperature is reduced by an amount in the range of 10°–40° C. by a single-stage, thermoelectric (solid state) cooler, which is an integral part of detector 34.

Referring still to FIG. 2 and 3, focusing means for controllably varying the distance between converging mirror 30 and detector 34 are indicated generally at 80. Focusing means 80, in the preferred embodiment, comprises a sliding/rotating assembly including a sleeve 82 rigidly connected to mirror 30 and four pins, such as pins 84; a rotating assembly including a cylindrical casing 86 having quad, helically slotted holes through which pins 84 freely can slide, the slotted height of which can be slidably/rotatably traversed by sleeve 82, and including a rigidly joined shaft 88 having a knob 90 on the end exiting housing 58; and a stationary assembly including diametrically opposed braces 92, each having dual, vertically slotted holes through which pins 84 freely can slide. It will be appreciated by those skilled in the art that the reciprocal rotation of knob 90 causes the reciprocal translation of mirror 30 along its focal axis. Focusing means 80 thus provides for the convenient, manual control of the distance between the reflective surface 30a of converging mirror 30 and detector 34, to accommodate a range of distances to remote target 18, thereby to focus successive pixels of the reflected image of target 18 onto detector 34.

Braces 92 are, in the preferred embodiment, rigidly mounted within housing 58 to a framing member 94, which provides desirable rigidity of optical subsystem 12 within housing 58. As may be seen with specific reference to FIG. 3, housing member 94 extends generally rearwardly from focusing means 80 and then downwardly, where its rear portion rigidly mounts heatsink 34a in cantilever fashion. It will be appreciated by those skilled in the art that framing member 94 ensures the desirably stable, optical alignment of detector 34 on focal axis 32 (refer to FIG. 1) of converging mirror 30, regardless of the orientation of housing 58 relative to arm 62 and regardless of the focal position of converging mirror 30, when translated along its focal axis by focusing means 80. It also will be appreciated that framing member 94 may be made of a lightweight, durable material, e.g. aluminum, as in the preferred embodiment of the invention.

Specific reference now is made to FIG. 3, which is a side elevation of optical subsystem 12, in cutaway view through side panel 96 of housing 58. It will be understood by those skilled in the art that the scanning and panning motion of mirror 20 essentially determines the orientation of the field of view of converging mirror 30, wherein the field of view's central axis is caused momentarily to intersect a location on target 18 that is represented by a corresponding pixel momentarily focused on detector 34. Clearly, so long as central, transmissive region 20a of scanning mirror 20 insubstantially interrupts the reflective surface thereof, there will be only a slight loss of contrast in the infrared image formed by image forming means 14 (refer to FIG. 1). It will be appreciated that, by appropriately locating detector 34 relative to scanning mirror 20 and converging mirror 30, detector 34 will 'see' a pixel by pixel image of target 18's infrared radiation at successive points in time represented by the angular positions of scanning and panning motors 36, 38. Thus detecting means and rotating means cooperate to produce a signal representing rasterized, pixel data interpretable as the temperature of target 18 at multiple, elemental locations thereacross. As described in reference to FIG. 1 above, image forming means 14 sample the signal outputted by preamplifier 40 of the detecting means to produce an image memory 50 containing a two-dimensional, pixel representation of target 18's thermal radiation.

Figure 4:
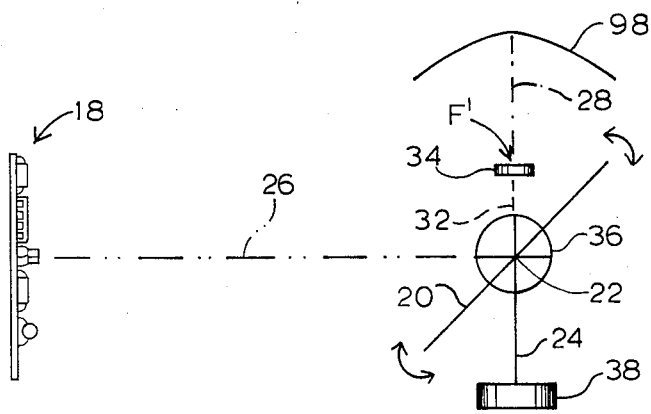
FIG. 4 is a schematic illustration corresponding to FIG. 1, except that it shows modifications to the preferred embodiment in which the detector interposes the scanning and converging mirrors, and in which the converging mirror is of generally parabolic shape.

Turning finally to FIG. 4, two proposed modifications to the preferred embodiment of the invention are illustrated in a combined, schematic form that corresponds to FIG. 1. It will be understood that, where components of optical subsystem 12 are shown in FIG. 4 that correspond to those shown in FIG. 1, identical reference designators are used. It also will be appreciated that, in the interest of clarity, optical subsystem 12 is illustrated in FIG. 4 only in pertinent part.

The first proposed modification best may be understood by comparison of FIGS. 1 and 4. It will be seen that, in FIG. 4, a converging mirror 98 of generally parabolic shape is shown, corresponding to spherical converging mirror 30, in FIG. 1. As is well-known, a parabolic converging mirror is ideally suited to focusing energy that is incident upon it in parallel with its focal axis. It also will be understood by those skilled in the art that a parabolic converging mirror is less tolerant of off-axis incident energy than is a spherical converging mirror. Nevertheless, due to the on-axis orientation of optical subsystem 12 in the preferred embodiment of the invention, the position of detector 34, relative to the focal axis 28 of a converging mirror, easily and well may be maintained, thereby enabling parabolic converging mirror 98 to be used to produced the desired, high-resolution, infrared image.

The other modification illustrated in FIG. 4 is to the preferred location of detector 34 'behind' scanning mirror 30, as illustrated best in FIG. 1, wherein scanning mirror 20 interposes converging mirror 30 and detector 34. In the proposed modification to the invention illustrated in FIG. 4, detector 34 interposes scanning mirror 20 and converging mirror 98, insubstantially occluding the infrared energy reflected by scanning mirror 20, and being preferably located on focal axis 32 at the focal point F' of mirror 98. As in the preferred embodiment of the invention, scanning mirror 20 is oriented, in its null position, with an instantaneous line-of-sight of target 18 along axis 26, thereby to produce reflection axis 28, which is preferably collinear with focal axis 32. It will be appreciated that, although the proposed modifications to the preferred embodiment are illustrated by way of a single figure, they may be implemented, within the spirit of the invention, alone or in combination.

The advantages of the present invention now should be apparent to those skilled in the art. By the combination in an on-axis optical subsystem of a single, single-faceted, planar scanning mirror that is reciprocable by stepper motors about two orthogonal axes, a spherical converging mirror moveable along its focal axis to accommodate a range of targets, and a single-element, non-cryogenically cooled detector, the invention makes possible the raster scanning of a remote target to detect its pixel by pixel infrared radiation. Image forming means are provided, by combining conventional ADC, microprocessor, motor drive and image memory circuits to produce a two-dimensional, high-resolution image representative of the temperature of the target. Displaying means, cooperable with the image forming means, provide conventional color composite viewing of the 'snapshot' image produced over a several second interval. The equipment is packaged so that the optical subsystem may be distanced from the electronics cabinet, to provide truly manual portability of the apparatus and flexibility in the positioning and orientation of the optical subsystem.

Accordingly, while the preferred embodiment of the invention and modifications thereto have been described herein, it is appreciated that further modifications are possible that come within the scope of the invention.

It is claimed and desired to secure by Letters Patent:

1. Manually portable flying-spot apparatus for detecting and imaging the thermal profile of a remote target comprising:
    a single-faceted, generally planar scanning mirror;
    means for rotating said mirror, controllably and reciprocably, about at least two generally orthogonal axes the intersection of which and the target defining therebetween a line-of-sight axis;
    means for detecting, by time-successive sampling, the level of infrared energy incident upon said scanning mirror, in timed relation to rotating thereof, to produce a modulated pixel-by-pixel signal representing the energy density of the target at multiple elemental locations thereacross; and
    means responsive to such signal for producing data which represent a high-solution, two-dimensional image of the thermal profile of the target.

2. The apparatus of claim 1, wherein said detecting means includes a non-cryogenically cooled, heat-sensitive element.

3. The apparatus of claim 1, wherein said scanning mirror is oriented to receive infrared energy, which is incident thereupon generally collinear with such line-of-sight axis and generally from the direction of the target, and to reflect such energy generally along a reflection axis, further comprising a converging mirror positioned generally on such reflection axis to receive a substantial portion of such reflected infrared energy, to reflect such energy into a convergent beam, and to direct such beam toward said detecting means.

4. The apparatus of claim 3, wherein said converging mirror is curvilinear, said converging mirror defining a focal point located on a focal axis at a focal length from the reflective surface thereof, and wherein said detecting means is located generally at such focal point.

5. The apparatus of claim 4, wherein such focal axis and such reflection axis are generally collinear.

6. The apparatus of claim 5, wherein said converging mirror is of generally spherical shape.

7. The apparatus of claim 5, wherein said converging mirror is of generally parabolic shape.

8. The apparatus of claim 5, wherein said scanning mirror is positioned relative to said converging mirror in such manner that such focal axis intersects such scanning mirror generally at the center thereof.

9. The apparatus of claim 8, wherein a central region of said scanning mirror is treated in such manner that it is capable of substantially transmitting infrared energy incident thereon, said central region insubstantially interrupting the reflective surface of said scanning mirror.

10. The apparatus of claim 9, wherein said scanning mirror interposes said converging mirror and said detecting means.

11. The apparatus of claim 8, wherein said detecting means interposes said converging mirror and said scanning mirror, said detecting means insubstantially occluding the infrared energy reflected by said scanning mirror.

12. The apparatus of claim 8, wherein such orthogonal axes intersect in the plane of said scanning mirror.

13. The apparatus of claim 12, wherein such orthogonal axes intersect generally at the center of said scanning mirror.

14. The apparatus of claim 13, wherein one of such orthogonal axes is generally collinear with such focal axis of said converging mirror.

15. The apparatus of claim 4, further comprising means for controllably varying the distance between said detecting means and said converging mirror, thereby to focus the reflection of the target onto said detecting means.

16. The apparatus of claim 1, wherein said rotating means and said detecting means are cooperable to produce such modulated signal in such manner that such signal represents rasterized, pixel data interpretable as the temperature of the target at multiple, elemental locations thereacross, wherein said producing means includes means for storing the data represented by such signal, and wherein said producing means further includes computer means for manipulating the data when the same is stored within said storage means.

17. The apparatus of claim 1, which further comprises means operatively coupled to said producing means for displaying, based upon such modulated signal, a high-resolution two-dimensional image of the thermal profile of the target.

* * * * *